United States Patent [19]

Fulmer et al.

[11] 4,314,034
[45] Feb. 2, 1982

[54] POLYUREA POLYURETHANE FOAMED SPONGE WITH HIGH WET STRENGTH

[75] Inventors: Glenn E. Fulmer, Clarksville; Conrad Vollmerhausen, Fulton, both of Md.

[73] Assignee: W. R. Grace & Co., New York, N.Y.

[21] Appl. No.: 220,563

[22] Filed: Dec. 29, 1980

[51] Int. Cl.³ .............................................. C08G 18/14
[52] U.S. Cl. .......................................... 521/65; 521/67; 521/72; 521/99; 521/114; 521/116; 521/137; 521/159; 521/160; 521/905
[58] Field of Search ...................... 521/65, 67, 72, 99, 521/114, 116, 137, 159, 160, 905

[56] References Cited

U.S. PATENT DOCUMENTS

| | | | |
|---|---|---|---|
| 3,806,474 | 4/1974 | Blair | 521/905 |
| 3,861,993 | 1/1975 | Guthrie | 521/905 |
| 4,051,081 | 9/1977 | Jabs et al. | 521/905 |
| 4,160,076 | 7/1979 | Guthrie et al. | 521/905 |
| 4,181,770 | 1/1980 | Schuhmacher et al. | 521/159 |

Primary Examiner—Maurice J. Welsh
Attorney, Agent, or Firm—Edward J. Cabic

[57] ABSTRACT

An open cell polyurea polyurethane foamed sponge is produced by mixing together a resin and an aqueous pahse. The resin phase consists of a prepolymer made from a hydrophilic oxyalkylene polyol which is capped with isocyanate groups and from about 1–30% by weight of the prepolymer of a polymeric polysocyanate such as a PAPI resin. The aqueous phase contains water, reinforcing fibers, surfactants, a thickening agent and preferably up to 40% by weight of diatomaceous earth. The resulting foam has a reduced volume swell, rapid wet out and improved wet strength.

16 Claims, No Drawings

POLYUREA POLYURETHANE FOAMED SPONGE WITH HIGH WET STRENGTH

BACKGROUND OF THE INVENTION

1. Field of the Invention

This invention relates to an improved wet strength polyurea polyurethane foamed product which can be used as a sponge.

2. Description of Previously Published Art

It has long been a goal of the sponge industry to substitute polyurethane foam for cellulose foam for use in wiping sponges or in sponge-based composites such as scrubbing pads or bathmats. In general, polyurethane foams of the previous art which are hydrophilic enough to be useful, tend to swell greatly when they are wet such as on the order of more than about 75-100% by volume. They dry slowly and nonuniformly, causing curling or cockling and they are aesthetically unacceptable.

In U.S. Pat. No. 3,806,474, a hydrophilic polyester urethane foam is disclosed. However, this foam has a large volume swell, it does not wet out rapidly and it does not wipe so as to leave a clean surface.

In U.S. Pat. No. 4,160,076, a simulated natural sponge based on hydrophilic polyurethane is disclosed. However, even though this simulates a natural sponge, it still has the problem like that of the natural sponges of a great amount of swelling when it is wet.

3. Objects of the Invention

It is an object of this invention to produce a polyurethane foam which behaves like a cellulose sponge with a volume swell of less than about 50% when wet, and preferably less than 35%.

It is a further object to add to a polyurethane foam forming composition the proper combination of additives to make the sponge stronger, less swellable, more rapidly wettable, and more durable.

These and further objects will become apparent as the description of the invention proceeds.

SUMMARY OF THE INVENTION

Polyurea polyurethane foams which are made from hydrophilic prepolymers such as a hydrophilic oxyalkylene polyol that is capped with isocyanate groups can be modified with a series of additives to produce a high wet strength sponge. When water is added to these prepolymers a reaction occurs and a foam is produced. One preferred additive is a polyisocyanate such as PAPI 135 made by Upjohn Polymer Chemicals, La-Porte, Texas in an amount of from about 1 to 40% by weight in the prepolymer mix. This and other PAPI products are a family of polymeric MDI produced by the reaction of carbonyl chloride with an aniline-formaldehyde condensate. The PAPI serves to make less swellable, more permeable and more readily wetable the resulting foraminous sponge that is obtained. Another significant additive consists of adding to the aqueous suspension up to 40% by weight of diatomaceous earth. This material improves the wetability property of the sponge. The combination of the PAPI and diatomaceous earth seems to provide a synergistic effect which results in superior air permeability, improved wet strength and an increased rate of wetability. To further improve the durability of the sponge relatively short fibers of about ½ inch or less in an amount of about 10% or less are added to the aqueous suspension. Preferable fibers are polyester fibers.

In making the polyurethane foam the preferred procedure is to add about an equal amount of the aqueous suspension with the prepolymer mixture and to then mix the two together. The composition of the aqueous suspension can be also expressed on the basis of 100 parts of prepolymer resin. Thus, 100 parts of water per 100 parts of resin is written 100 phr water. The ratio of the amount of the prepolymer mixture to the aqueous suspension can vary over a wide range. However, if the amount of the aqueous suspension is too large, then the strength of the resulting foam drops. On the other hand if the amount of the aqueous suspension is decreased too much, then it will not be possible to add enough fibers and fillers which are supplied via the aqueous suspension.

A preferred composition contains the prepolymer resin; 100 phr water; a mixture of surfactants such as about 0.937 phr PLURONIC ® L-62 and about 0.025 phr PLURONIC P-75; and a thickening agent such as about 0.4 phr CARBOPOL 941 which is a high molecular weight acrylic acid polymer. The Carbopol can be neutralizing to a pH 7 level with ammonium hydroxide such as by adding about 0.9 phr of a 33% $NH_4OH$ solution.

To the aqueous suspension can be added from 0 to 40% by weight diatomaceous earth which acts as a filler and which enhances the wetting out property of the foam.

If after adding the initial Carbopol the suspension is not thick enough or the suspension is not pumpable, then additional Carbopol can be used in the formulation and it also can be neutralized.

By mixing together the prepolymer composition and the aqueous suspension containing these additives, a sponge useful for household or industrial purposes is produced which is strong, less swellable than other polyurethane foams, quite durable and more rapidly wettable.

DESCRIPTION OF THE PREFERRED EMBODIMENTS

In making these foam formulations it is preferred to use a prepolymer which combines with water to form a polyurea-polyurethane foam. The preferred prepolymer is a hydrophilic oxyalkylene polyol which is capped with isocyanate groups. Examples of commercially available prepolymers of this type are the family of HYPOL FHP prepolymers sold by W. R. Grace & Co. which include HYPOL 2000, 2000HD and 3000. These prepolymers are made from varying ratios of a polyalkylene glycol and a polyhydric alcohol containing 3 or 4 hydroxyl groups per molecule with enough toluene-diisocyanate to cap all of the hydroxyl groups. As discussed herein the Hypol 2000HD is the most preferred prepolymer. However, Hypol 2000 can be used and Hypol 3000 will produce a tougher foam, but one that does not wet as well.

As to the polyether polyurethane prepolymers which are preferably employed, they are hydrophilic, i.e., usually at least 40 mole percent of the oxyalkylene units in the prepolymer backbone are oxyethylene units with the balance being oxypropylene, oxybutylene or other oxyalkylene units. In the resulting polyurethane foams, the branch-points of the polymer chains are connected by essentially linear polyoxyalkylene chains containing at least 40 mole percent of oxyethylene units (excluding initiators at branch-points) as described above. Where the oxyethylene content is from about 40 to 75 mole percent, it may be desirable to use a surfactant to promote dispersion of the polymer in water prior to foaming.

The polymeric polyisocyanate is added in an amount of 0–40% by weight of the prepolymer. The commercially available PAPI series made by Upjohn Polymer Chemicals are particularly advantageous because of their relatively low cost. These are a family of polymeric MDI produced by the reaction of carbonyl chloride with an aniline-formaldehyde condensate. MDI is the compound 4,4'-diphenylmethane diisocyanate. The PAPI family consists of mixtures of MDI and the polymeric forms of the phenyl isocyanates that made up MDI which are linked together by methylene groups. MDI has a functionality of about 2.0 and when mixed with the phenylisocyanate trimers and tetramers the resulting mixtures have average functionalities from about 2.0 up to about 3.0. Most preferred is the product PAPI 135 which is a medium viscosity polymethylene polyphenylisocyanate of higher reactivity with an average end use functionality of about 2.7.

In making the polyurethane foam the preferred procedure is to add about an equal amount of the aqueous suspension with the prepolymer mixture and to then mix the two together. The composition of the aqueous suspension can be also expressed on the basis of 100 parts of prepolymer resin. Thus, 100 parts of water per 100 parts of resin is written 100 phr water. The ratio of the amount of the prepolymer mixture to the aqueous suspension can vary over a wide range. However, if the amount of the aqueous suspension is too large, then the strength of the resulting foam drops. On the other hand if the amount of the aqueous suspension is decreased too much, then it will not be possible to add enough fibers and fillers which are supplied via the aqueous suspension.

The diatomaceous earth filler particles, which are added in an amount of from 0 to 40% by weight of the aqueous suspension, can be of any of the commercially available varieties. It is preferred to use the smaller sizes although larger particles have been found to be effective. Some types of diatomaceous earth particles have a high pH. Although they are not preferred, they will work. The diatomaceous earth has been found to improve the wetting out property of the foam.

Fibers are preferably added to the composition to provide sufficient structural rigidity. Polyester fibers are especially advantageous and they can be cut up into lengths of about ½ inch or less. The fibers are helpful when added in any amount, but with respect to the aqueous suspension they preferably do not constitute more than about 10% by weight because above that level the suspension becomes too difficult to pump.

A high molecular weight suspending or thickening agent is added to serve two functions. First it keeps the ingredients suspended so the water does not drain out of the fibers and so that the fibers do not float. Secondly, the thickening agent acts as a lubricant for the fibers so they do not tangle, dewater and jam up when going through the mixing pump. Example of thickening agents are Polyox WSR, Natrosol, Xanthan gums, and polyacrylamides such as Dow's Separan AP30 which have high molecular weights of about one million or so.

Preferred suspending or thickening agents are the Carbopol resins made by the B. F. Goodrich Chemical Co. such as Carbopol 934, Carbopol 940 and especially Carbopol 941 which is a polyacrylic acid polymer having an approximate molecular weight of 1,250,000. Since the Carbopol resins are acrylic acid polymers with an acid moiety, a neutralizing agent such as sodium or ammonium hydroxide can be added. When adding ammonium hydroxide as the neutralizing agent to the Carbopol, there is an advantageous increase in viscosity of the aqueous phase. Also since ammonium hydroxide is less expensive then Carbopol, a more economical formulation having the same amount of thickening can be made which utilizes less Carbopol.

Some of the suspending or thickening agents may have surface active properties so they can also be a part of the surfactant system which controls the cell size of the resulting sponge.

Surfactants are chosen to give a foam with a good appearance that has the correct cell size, shape and lack of collapse or splits. Combinations of surfactants known to be useful in polyurethane foams have been very successful and it is necessary to balance the foaming type surfactants against the antifoamer types which are required, for example, to obtain the proper cell size. Examples of preferred surfactants are the block copolymers of oxyethylene and oxypropylene such as the PLURONIC POLYOL surfactants manufactured by BASF Wyandotte Corp. of Wyandotte, Michigan. A preferred combination includes PLURONIC L-62 and PLURONIC P-75. PLURONIC L-62 is a diol made by capping poly(oxypropylene) of molecular weight of about 1750 with ethylene oxide such that the resultant liquid product contains about 20% by weight of ethylene oxide and PLURONIC P-75 is a diol made by capping poly(oxypropylene) of molecular weight of about 2050 with ethylene oxide such that the resultant product contains about 50% by weight of ethylene oxide.

Sponges have been produced according to this invention which have a good, soft feel and which are easily squeezed dry. These sponges are quick wetting, have good wiping properties and have high wet strength.

Foams made according to this invention generally have a volume swell of about 50% or less and can be used as wiping cloths or as an air filter. For those sponges to be used in household applications, it is generally preferred to formulate them with a volume swell of 35% or less.

Having described the basic aspects of our invention, the following examples are given to illustrate the specific embodiments thereof.

TESTS USED IN EVALUATING THE SPONGES

The following test procedures were utilized. All the foam samples to be tested were cut in the dry state to a uniform $1'' \times 3'' \times 5''$ size and dried to a constant moisture-free weight at $105° \pm 5°$ C. The samples were weighed to the nearest 0.1 gram. Groups of 10 representative samples were used for the tests. cl A. Wet-Out Time From Dry State In a pan filled with water, the bone-dry foam is floated on the surface. The time is recorded in seconds required for the entire sample to wet out; that is, when water appears and wets the entire top surface of a sample.

B. Wet-Out Time From Wet State

The foam is thoroughly wetted out and passed through a washing machine wringer to obtain a uniform dampness. The damp foam is floated on the surface of a pan filled with water. The time is recorded in 0.1 seconds that is required for the entire sample to wet out.

C. Determination of Washing Machine Durability

After drying the 1"×3"×5" samples for one hour at 105° C.±5° they are weighed to ±0.02 grams. In a Maytag type, vertical washing machine filled with water are placed 48 samples and they are agitated for 72 hours. The samples are dried and reweighed.

$$\% \text{ Wt. Loss} = \frac{(\text{Original dry wt.} - \text{final dry wt.}) \times 100}{\text{Original dry weight}}$$

Most of the foams did not survive in one piece for the 72 hour period, but they may still be satisfactory for use as a sponge or for other foam applications because this is a very severe test. If they did not survive the 72 hour period, then the results are reported for the observed time period in hours at which time visible deterioration could be observed.

D. Determination of Tear Strength

The 1"×3"×5" samples are split in the 1"×3" plane for a distance of 2½". The jaws of a Scott Tester, Model J-1 (or equivalent), are set to a one-inch opening between the upper and lower jaws. One of the split sections is clamped to each of the jaws of the Scott Tester. The Tester is activated and tear resistance in pounds is recorded.

E. Determination of Failure Stress

An Instron Tester, equipped with jaws for testing sponge or similar materials, is used to determine the tenacity. The jaws of the Instron Tester are set to a one-inch opening between the upper and lower jaws. The three-inch dimension in each jaw is clamped and the Tester is activated. The tenacity in pounds is recorded. This value is converted to pounds per square inch by dividing the tenacity by the width of jaws in contact with the sample.

F. Determination of Air Permeability

The testing device used consists of a fan connected to a tube with a portion of the sample placed over the end of the tube. The air pressure on the upstream side of the sponge is measured. The air pressure gauge is calibrated so that if the material is impervious the reading is 0.60. If the reading is zero, then there is very little pressure drop across the sponge indicating a very high porosity and a very open cell structure.

G. Modulus

This is measured from the stress-strain curve at 1% elongation.

EXAMPLES 1-3

These examples illustrate varying the amount of CARBOPOL 941 to obtain a mixture which easily passes through the pump and which is not dewatered.

In these runs 1,000 grams of FHP 2000 HD was used along with 250 g. of PAPI 135. To an aqueous phase of 1,000 g. of water were added 9.37 g. of PLURONIC L-62, 2.5 g. of PLURONIC P-75, 50 g. of Polyester Fiber 2 which are ½ inch fibers made by Mini Fibers, Inc. Weber City, Virginia, and 200 g. of Celite which is a trademark for diatomaceous earth produced by the Johns-Manville Products Corporation. All of the examples were made by hand mixing with a drill motor using a 3-bar mixer made from 1 inch stainless steel rod.

The results are set forth in Table 1. For Example 1 where only 4 g. of CARBOPOL 941 were used with 9.0 g. of ammonium hydroxide to neutralize the CARBOPOL, there was a dewatering problem with the aqueous phase such that it could not have been pumped. In Example 2 the amount of CARBOPOL was doubled and there was still somewhat of a dewatering problem, again such that it could not have been pumped. However, at a level of 16 g. of CARBOPOL in Example 3, there was enough CARBOPOL to correct the dewatering problem so that the material could probably have been pumped adequately through the system.

TABLE 1

|  | Example 1 | Example 2 | Example 3 |
|---|---|---|---|
| Carbopol 941 g. | 4 | 8 | 16 |
| Properties | | | |
| Density Lbs./ft.$^3$ | 4.49 | 4.06 | 3.99 |
| Wet Out Times | | | |
| Dry State Sec | 19.6 | 12.0 | 33.1 |
| Wet State Sec | 3.7 | 1.65 | 2.25 |
| % Volume Swell | 18.6 | 18.4 | 19.6 |
| Washing Machine Durability (Hrs.) | 72* | 8-24 | 24-31 |
| Tear | | | |
| Dry Lbs/3" Width | 15.7 | 8.4 | 9.5 |
| Wet Lbs/3" Width | 6.5 | 4.7 | 3.9 |
| Dry | | | |
| Modulus, psi | 45 | 28 | 21 |
| F Stress, psi | 20 | 16 | 16 |
| F Strain, % | 146 | 77 | 99 |
| Wet | | | |
| Modulus, psi | 23 | 10 | 7 |
| F Stress, psi | 12 | 5 | 3 |
| F Strain, % | 65 | 90 | 80 |
| Air Permeability Cm H$_2$O | 0.22 | 0.10 | 0.14 |

*The samples in Example 1 survived the 72 hour test period and they had a weight loss of 36.1%

EXAMPLES 4-7

These examples illustrate the effect obtained by varying the amount of diatomaceous earth.

In each of these examples the same ingredients were used as in Example 3 with the exception that instead of the Celite, various other diatomaceous earth materials were used in the same amount of 200 g. The results are set forth in Table 2 along with the Celite in Example 3 for a further comparison. The results show that in all cases an acceptable product was obtained having a quick wet out time, a low volume swell, good air permeability and a product which contains all of the other good properties of these foams.

TABLE 2

| | Diatomaceous Earth - See Code Below | | | | |
|---|---|---|---|---|---|
| Examples | 3 | 4 | 5 | 6 | 7 |
| Properties | | | | | |
| Density Lbs./ft.$^3$ | 3.99 | 4.31 | 4.29 | 3.90 | 4.11 |
| Wet Out Times | | | | | |
| Dry State Sec | 33.1 | 23.8 | 31.8 | 33.7 | 75.9 |
| Wet State Sec | 2.25 | 1.9 | 2.25 | 2.90 | 3.0 |
| % Volume Swell | 19.6 | 23.4 | 24.6 | 26.2 | 12.1 |
| Washing Machine Durability (Hrs.) | 24-31 | 48-35 | 31-48 | 24-31 | 8-24 |
| Tear | | | | | |
| Dry Lbs/3" Width | 9.5 | 12.5 | 12.1 | 11.5 | 12.0 |
| Wet Lbs/3" Width | 3.9 | 2.9 | 4.6 | 3.5 | 5.1 |
| Dry | | | | | |

TABLE 2-continued

| | Diatomaceous Earth - See Code Below | | | | |
|---|---|---|---|---|---|
| Examples | 3 | 4 | 5 | 6 | 7 |
| Modulus, psi | 21 | 40 | 27 | 28 | 26 |
| F Stress, psi | 16 | 24 | 20 | 16 | 14 |
| F Strain, % | 99 | 97 | 113 | 83 | 73 |
| Wet | | | | | |
| Modulus, psi | 7 | 18 | 18 | 25 | 21 |
| F Stress, psi | 3 | 7 | 8 | 9 | 8 |
| F Strain, % | 80 | 74 | 63 | 56 | 78 |
| Air Permeability Cm H₂O | 0.14 | 0.16 | 0.06 | 0.16 | −0.04 |

| Ex. | Diatomaceous Earth |
|---|---|
| 3 | Celite made by Johns-Manville Products Corp. |
| 4 | Super Fine Super Floss made by Johns-Manville Products Corp. |
| 5 | Kenite Diatomite K-700 made by Witco Chemical Co., Inc. |
| 6 | Kenite Diatomite K-801 made by Witco Chemical Co., Inc. |
| 7 | Kenite Diatomite K-803 made by Witco Chemical Co., Inc. |

EXAMPLE 8

This example illustrates the effect obtained when fibers are not added to the aqueous formulation.

Here the formulation is the same as in Example 3, except there were no fibers present. The results are set forth in Table 3. This material was not completely satisfactory for a household sponge since the material quickly disintegrated in the washing machine durability test. In the tear test, the modulus test and the wet strength test the values were significantly lower.

TABLE 3

| | Example 8 |
|---|---|
| Properties | |
| Density Lbs./ft.³ | 3.60 |
| Wet Out Times | |
| Dry State Sec | 44.4 |
| Wet State Sec | 7.0 |
| % Volume Swell | 48.3 |
| Washing Machine Durability (Hrs.) | 1 |
| Tear | |
| Dry Lbs/3" Width | 5.9 |
| Wet Lbs/3" Width | 1.1 |
| Dry | |
| Modulus, psi | 7 |
| F Stress, psi | 8 |
| F Strain, % | 149 |
| Wet | |
| Modulus, psi | 2 |
| F Stress, psi | 3 |
| F Strain, % | 209 |
| Air Permeability Cm H₂O | 0.15 |

EXAMPLES 9-28

In the following examples the effects of varying the amount of PAPI and diatomaceous earth were evaluated.

The diatomaceous earth used was Celite made by Johns-Manville Products Corp. In these examples the aqueous and resin phases were all hand-mixed and transferred to a dishpan mold.

The formulations had a resin phase on which the total amount of Hypol plus PAPI was 1250 g. In the aqueous phase there was 100 phr water, 0.937 phr PLURONIC L-62, 0.25 PLURONIC P-75, 0.4 phr CARBOPOL 941, 0.9 phr of a 33% NH₄OH solution and 5 phr polyester fibers. In Examples 9-12 there was no diatomaceous earth and the amount of PAPI 135 varied from 0 to 375 parts. The results are set forth in Table 4. In Examples 13-16 100 g. of diatomaceous earth were added with the amount of PAPI varied as in Examples 9-12. The results are in Table 5.

In Examples 17-20 the same variation of PAPI occurred with 200 g. of diatomaceous earth (Table 6), in Examples 21-24 again the amount of PAPI varied with 300 g. of diatomaceous earth (Table 7) and finally in Examples 25-28 the amount of diatomaceous earth present was 400 g. with the results in Table 8.

These results show the diatomaceous earth and PAPI altered the cell structure to give a very open and porous foam. The densities were in a desirable range. The optimum density is the lowest density and occurred at about 250 g. of PAPI. The optimum formulation was near that obtained in Example 19.

TABLE 4

| | Diatomaceous Earth: none | | | |
|---|---|---|---|---|
| Example | 9 | 10 | 11 | 12 |
| Amount of PAPI, g. | 0 | 125 | 250 | 375 |
| Amount of HYPOL, g. | 1250 | 1125 | 1000 | 875 |
| Properties | | | | |
| Density Lbs./ft.³ | 7.10 | 4.59 | 4.08 | 4.40 |
| Wet Out Times | | | | |
| Dry State Sec | 268.1 | 46.0 | 117.6 | 44.1 |
| Wet State Sec | 31.3 | 93.5 | 46.6 | 2.3 |
| % Volume Swell | 47.8 | 35.4 | 30.2 | 27.6 |
| Washing Machine Durability (Hrs.) | 2-19 | 19-24 | 50-72 | 19-24 |
| Tear | | | | |
| Dry Lbs/3" Width | 16.5 | 11.6 | 14.2 | 9.2 |
| Wet Lbs/3" Width | 2.7 | 3.6 | 5.1 | 4.0 |
| Dry | | | | |
| Modulus, psi | 6 | 6 | 19 | 22 |
| F Stress, psi | 9 | 10 | 17 | 21 |
| F Strain, % | 210 | 249 | 169 | 112 |
| Wet | | | | |
| Modulus, psi | 2 | 4 | 6 | 21 |
| F Stress, psi | 2 | 4 | 7 | 12 |
| F Strain, % | 207 | 136 | 129 | 87 |
| Air Permeability Cm H₂O | .59 | .45 | .18 | .14 |

TABLE 5

| | Diatomaceous Earth: 100 g. | | | |
|---|---|---|---|---|
| Example | 13 | 14 | 15 | 16 |
| Amount of PAPI, g. | 0 | 125 | 250 | 375 |
| Amount of HYPOL, g. | 1250 | 1125 | 1000 | 875 |
| Properties | | | | |
| Density Lbs./ft.³ | 6.61 | 4.40 | 4.17 | 4.30 |
| Wet Out Times | | | | |
| Dry State Sec | 286.9 | 8.4 | 14.2 | 4.6 |
| Wet State Sec | 73.4 | 2.1 | 2.7 | 1.3 |
| % Volume Swell | 54.8 | 27.9 | 35.2 | 26.0 |
| Washing Machine Durability (Hrs.) | 2-19 | 2-19 | 2-19 | 2-19 |
| Tear | | | | |
| Dry Lbs/3" Width | 14.0 | 9.8 | 9.3 | 9.6 |
| Wet Lbs/3" Width | 2.1 | 3.9 | 5.1 | 8.3 |
| Dry | | | | |
| Modulus, psi | 17 | 8 | 9 | 24 |
| F Stress, psi | 16 | 9 | 10 | 17 |
| F Strain, % | 171 | 156 | 123 | 86 |
| Wet | | | | |
| Modulus, psi | 4 | 6 | 8 | 24 |
| F Stress, psi | 3 | 4 | 4 | 10 |
| F Strain, % | 158 | 173 | 64 | 51 |
| Air Permeability Cm H₂O | .59 | .47 | .02 | .04 |

TABLE 6

| | Diatomaceous Earth: 200 g. | | | |
|---|---|---|---|---|
| Example | 17 | 18 | 19 | 20 |
| Amount of PAPI, g. | 0 | 125 | 250 | 375 |
| Amount of HYPOL, g. | 1250 | 1125 | 1000 | 875 |
| Properties | | | | |
| Density Lbs./ft.$^3$ | 7.53 | 5.05 | 4.33 | 4.91 |
| Wet Out Times | | | | |
| Dry State Sec | 83.8 | 14.1 | 11.1 | 14.6 |
| Wet State Sec | 31.2 | 4.4 | 2.5 | 3.5 |
| % Volume Swell | 53.7 | 28.6 | 26.9 | 18.2 |
| Washing Machine Durability (Hrs.) | 2-19 | 0-2 | 49-50 | 2-19 |
| Tear | | | | |
| Dry Lbs/3" Width | 22.8 | 10.5 | 7.8 | 11.2 |
| Wet Lbs/3" Width | 4.4 | 2.5 | 4.5 | 4.3 |
| Dry | | | | |
| Modulus, psi | 5 | 6 | 28 | 4 |
| F Stress, psi | 6 | 9 | 19 | 9 |
| F Strain, % | 160 | 182 | 92 | 304 |
| Wet | | | | |
| Modulus, psi | 3 | 3 | 13 | 16 |
| F Stress, psi | 3 | 4 | 7 | 8 |
| F Strain, % | 172 | 165 | 70 | 69 |
| Air Permeability Cm H$_2$O | .58 | .48 | .19 | .03 |

TABLE 7

| | Diatomaceous Earth: 300 g. | | | |
|---|---|---|---|---|
| Example | 21 | 22 | 23 | 24 |
| Amount of PAPI, g. | 0 | 125 | 250 | 375 |
| Amount of HYPOL, g. | 1250 | 1125 | 1000 | 875 |
| Properties | | | | |
| Density Lbs./ft.$^3$ | 7.84 | 4.87 | 4.36 | 4.70 |
| Wet Out Times | | | | |
| Dry State Sec | 72.6 | 9.8 | 5.7 | 9.3 |
| Wet State Sec | 25.4 | 3.7 | 1.4 | 1.6 |
| % Volume Swell | 44.4 | 21.4 | 18.9 | 19.9 |
| Washing Machine Durability (Hrs.) | 0-2 | 2-19 | 2-19 | 2-19 |
| Tear | | | | |
| Dry Lbs/3" Width | 12.6 | 6.7 | 8.0 | 8.9 |
| Wet Lbs/3" Width | 3.0 | 2.4 | 3.4 | 6.7 |
| Dry | | | | |
| Modulus, psi | 19 | 10 | 18 | 23 |
| F Stress, psi | 15 | 9 | 9 | 15 |
| F Strain, % | 99 | 132 | 80 | 93 |
| Wet | | | | |
| Modulus, psi | 3 | 8 | 11 | 17 |
| F Stress, psi | 2 | 4 | 6 | 6 |
| F Strain, % | 129 | 77 | 51 | 49 |
| Air Permeability Cm H$_2$O | .58 | .46 | .09 | .03 |

TABLE 8

| | Diatomaceous Earth: 400 g. | | | |
|---|---|---|---|---|
| Example | 25 | 26 | 27 | 28 |
| Amount of PAPI, g. | 0 | 125 | 250 | 375 |
| Amount of HYPOL, g. | 1250 | 1125 | 1000 | 875 |
| Properties | | | | |
| Density Lbs./ft.$^3$ | 7.88 | 4.97 | 4.47 | 4.94 |
| Wet Out Times | | | | |
| Dry State Sec | 255.9 | 6.7 | 3.7 | 8.4 |
| Wet State Sec | 28.4 | 3.0 | 1.1 | 1.1 |
| % Volume Swell | 45.8 | 26.0 | 19.0 | 18.0 |
| Washing Machine Durability (Hrs.) | 0-2 | 0-2 | 0-2 | 2-19 |
| Tear | | | | |
| Dry Lbs/3" Width | 9.9 | 6.7 | 4.7 | 8.1 |
| Wet Lbs/3" Width | 2.1 | 2.0 | 3.4 | 3.4 |
| Dry | | | | |
| Modulus, psi | 5 | 10 | 11 | 21 |
| F Stress, psi | 9 | 7 | 8 | 10 |
| F Strain, % | 254 | 93 | 97 | 70 |
| Wet | | | | |
| Modulus, psi | 2 | 3 | 5 | 7 |
| F Stress, psi | 1 | 2 | 2 | 3 |
| F Strain, % | 57 | 95 | 69 | 62 |
| Air Permeability Cm H$_2$O | .56 | 0 | 0 | 0 |

One clear effect of the filler is to add weight and to thus increase the density.

As the amount of PAPI 135 and diatomaceous earth increase, there is a drop in elongation. Since it is desirable to have a certain amount of elongation, the addition of too much of both of these materials is not advantageous.

The addition of the PAPI 135 markedly increased the wet tensile strength as measured by the F stress. Similarly, there is an increase of wet tear strength as the PAPI 135 is increased. The wet tear strength, however, will be decreased if too much diatomaceous earth is used.

The time for the wet out from the wet state is dramatically improved when PAPI 135 and diatomaceous earth are used in combination and a similar improved result is seen in wet out times from the dry state.

The air permeability is a measure of the openness of the cell structure. When the reading is 0.6 the foams do not transmit air readily whereas the lower the number the greater the amount of air that is transmitted. When no PAPI 135 is used, the cells are tight and it is difficult to squeeze water out of the sponge. These sponges are reluctant to quickly expand back to their original shape. When soapy water is used the results are even worse. When near the optimum formulation of about 250 g. of PAPI and 200 g. of diatomaceous earth, then the sponges are very permeable to air, water and soap solutions.

It is desirable to have the percentage of volume swell be less than about 50% and especially for the household-type sponge use to have the volume swell of the sponge to be less than 35%. Sponges with a much larger volume swell will expand on wetting from a household-size sponge to a car wash type size sponge. As seen from the results in Tables 1, 2 and 4-8, formulations according to this invention can be obtained in which the volume swell is less than 35%. The lowest values are obtained with the higher loadings of diatomaceous earth. On the other hand, when large amounts of diatomaceous earth are present the best strength is not obtained and thus a compromise has to be sought. A combination of the PAPI with diatomaceous earth, however, does result in a dramatic improvement over the result where neither of these components is present.

The sponges all have a very good surface feel to them and do not develop the characteristic slimy feel after use as evidenced by many of the polyurethane sponges of the prior art.

What is claimed:

1. In a foamed sponge made by mixing together
   (a) a resin phase comprising a prepolymer of a hydrophilic oxyalkylene polyol which is capped with isocyanate groups, and (b) an aqueous suspension containing fibers and at least one surfactant, the improvement comprising adding to the mixture prior to foam formation
  (i) from about 1–40% by weight of the prepolymer of part (a) of a polymeric polyisocyanate selected from the group consisting of 4,4'-diphenylmethane diisocyanate, and a mixture of 4,4'-diphenylmethane diisocyanate and polymethylene polyphenylisocyanates, said mixture having an average functionality of about 2.0 to 3.0, and
  (ii) from about 0–40% by weight of the aqueous suspension of part (b) of diatomaceous earth, whereby an open cell foamed sponge is obtained having a reduced volume swell, rapid wet out and improved wet strength.

2. A foamed sponge according to claim 1, wherein the surfactant is at least one member selected from the group consisting of block copolymers of oxyethylene and oxypropylene.

3. A foamed sponge according to claim 2, wherein the surfactant is at least one member selected from the group consisting of a diol made of capping poly(oxypropylene) of molecular weight of about 1750 with ethylene oxide such that that resultant liquid product contains about 20% by weight of ethylene oxide, a diol made by capping poly(oxypropylene) of molecular weight of about 2050 with ethylene oxide such that the resultant product contains about 50% by weight of ethylene oxide and mixtures thereof.

4. A foamed sponge according to claim 1, further comprising a thickening or suspending agent.

5. A foamed sponge according to claim 4, wherein the thickening or suspending agent is a high molecular weight polycarboxylic acid.

6. A foamed sponge according to claim 5, wherein the polycarboxylic acid is a polyacrylic acid polymer having an approximate molecular weight of 1,250,000.

7. A foamed sponge according to claim 5, wherein the polycarboxylic acid is neutralized.

8. A foamed sponge according to claim 7, wherein the polycarboxylic acid is neutralized with ammonium hydroxide prior to mixing with the prepolymer.

9. A foamed sponge according to claim 1 wherein the fibers are polyester fibers of a length of about ½ inch or less.

10. A foamed sponge according to claim 1, wherein the polymeric polyisocyanate is a polymethylene polyphenylisocyanate having an average functionality of about 2.7.

11. A foamed sponge according to claim 1, wherein the volume swell is reduced to a level of about 50% or less.

12. A foamed sponge according to claim 11, wherein the volume swell is reduced to a level of 35% or less.

13. In a method of making a foamed sponge by mixing together
  (a) a resin phase comprising a prepolymer of a hydrophilic oxyalkylene polyol which is capped with isocyanate groups, and
  (b) an aqueous suspension containing fibers and at least one surfactant, the improvement comprising adding to the mixture prior to foam formation
    (i) from about 1–40% by weight of the prepolymer of part (a) of a polymeric polyisocyanate selected from the group consisting of 4,4'-diphenylmethane diisocyanate, and a mixture of 4,4'-diphenylmethane diisocyanate and polymethylene polyphenylisocyanates, said mixture having an average functionality of about 2.0 to 3.0, and
    (ii) from about 0–40% by weight of the aqueous suspension of part (b) of diatomaceous earth, whereby an open cell foamed sponge is obtained having a reduced volume swell, rapid wet out and improved wet strength.

14. A method according to claim 13, wherein the polymeric polyisocyanate is a polymethylene polyphenylisocyanate having an average functionality of about 2.7.

15. A method of making a foamed sponge by mixing together
  (a) a resin phase comprising a prepolymer of a hydrophilic oxyalkylene polyol which is capped with isocyanate groups, and from about 1–40% by weight of said prepolymer of a polymeric polyisocyanate selected from the group consisting of 4,4'-diphenylmethane diisocyanate, and a mixture of 4,4'-diphenylmethane diisocyanate and polymethylene polyphenylisocyanates, said mixture having an average functionality of about 2.0 to 3.0, and
  (b) an aqueous suspension comprising water, at least one surfactant, and about 0–40% by weight of diatomaceous earth,
whereby an open cell foamed sponge is obtained having a reduced volume swell, rapid wet strength and improved wet strength.

16. A method according to claim 15, wherein the polymeric polyisocyanate is a polymethylene polyphenylisocyanate having an average functionality of about 2.7.

* * * * *